United States Patent
Tiger

(10) Patent No.: US 9,511,874 B2
(45) Date of Patent: Dec. 6, 2016

(54) INERTING DEVICE, TANK AND AIRCRAFT PROVIDED WITH SUCH A DEVICE, AND CORRESPONDING METHOD

(71) Applicant: L'Air Liquide, Societe Anonyme pour l'Etude et l'Exploitation des Procedes Georges Claude, Paris (FR)

(72) Inventor: Xavier Tiger, Grenoble (FR)

(73) Assignee: L'Air Liquide, Sociètè Anonyme pour l'Ètude et l'Exploitation des Procedes Georges Claude, Paris (FR)

( * ) Notice: Subject to any disclaimer, the term of this patent is extended or adjusted under 35 U.S.C. 154(b) by 102 days.

(21) Appl. No.: 14/384,441

(22) PCT Filed: Jan. 25, 2013

(86) PCT No.: PCT/FR2013/050150
§ 371 (c)(1),
(2) Date: Sep. 11, 2014

(87) PCT Pub. No.: WO2013/135981
PCT Pub. Date: Sep. 19, 2013

(65) Prior Publication Data
US 2015/0041011 A1    Feb. 12, 2015

(30) Foreign Application Priority Data

Mar. 12, 2012 (FR) ...................................... 12 52187

(51) Int. Cl.
*B64D 37/32* (2006.01)
*B64D 37/10* (2006.01)
*G05D 16/20* (2006.01)

(52) U.S. Cl.
CPC ............... *B64D 37/32* (2013.01); *B64D 37/10* (2013.01); *G05D 16/204* (2013.01); *Y10T 137/86485* (2015.04)

(58) Field of Classification Search
CPC .. B64D 37/32; Y10T 137/2012; G05D 16/204
(Continued)

(56) References Cited

U.S. PATENT DOCUMENTS 2,362,297 A * 11/1944 Newell .................. B64D 37/12
                                                               137/512.1
3,590,559 A    7/1971 Bragg
(Continued)

OTHER PUBLICATIONS

International Search Report and Written Opinion for PCT/FR2013/050150, mailed May 10, 2013.
(Continued)

*Primary Examiner* — William McCalister
(74) *Attorney, Agent, or Firm* — Christopher J. Cronin

(57) ABSTRACT

The invention relates to an inerting device for a pressurized aircraft fuel tank, i.e. for a tank provided with a main vessel and a separate overflow space, the device including a generator of nitrogen-enriched gas, a circuit for transferring the nitrogen-enriched gas produced by the generator, the transfer circuit including an upstream end connected to the generator, a first downstream end which can be coupled to the main vessel and a second downstream end which can be coupled to the overflow space, the device including a sensor array for measuring information representative of a pressure differential between the interior of the overflow space and the exterior of the tank, the device further including an electronic logic unit receiving the measurements from the sensor array, the electronic logic unit being connected to the generator and/or to the transfer circuit, and being designed to control the supply of a nitrogen-enriched gas flow to the second downstream end when the pressure differential drops below a predetermined threshold S.

14 Claims, 2 Drawing Sheets

(58) Field of Classification Search
USPC .............. 137/81.1; 244/135 R, 135 A, 135 C
See application file for complete search history.

(56) References Cited

U.S. PATENT DOCUMENTS

| | | | | |
|---|---|---|---|---|
| 3,628,758 A * | 12/1971 | Nichols | ................... | B64D 37/32 |
| | | | | 244/135 R |
| 3,693,915 A * | 9/1972 | Ulanovsky | ............. | B64D 37/32 |
| | | | | 244/135 R |
| 3,788,039 A * | 1/1974 | Bragg | .................... | B64D 37/32 |
| | | | | 220/88.3 |
| 4,378,920 A * | 4/1983 | Runnels | ................. | B64D 37/32 |
| | | | | 137/209 |
| 4,950,315 A * | 8/1990 | Gollan | ................... | B01D 53/22 |
| | | | | 55/356 |
| 5,979,481 A * | 11/1999 | Ayresman | .............. | G05D 16/00 |
| | | | | 137/14 |
| 6,604,558 B2 * | 8/2003 | Sauer | ....................... | A62C 3/06 |
| | | | | 141/44 |
| 6,698,692 B1 * | 3/2004 | Tichenor | ................ | B64D 37/24 |
| | | | | 244/135 R |
| 6,739,359 B2 * | 5/2004 | Jones | ..................... | B64D 37/32 |
| | | | | 141/1 |
| 8,074,932 B2 | 12/2011 | Surawski | | |
| 8,313,061 B2 * | 11/2012 | Surawski | ............... | B64D 37/32 |
| | | | | 244/129.2 |
| 2002/0158167 A1 * | 10/2002 | Schmutz | .................. | A62C 3/06 |
| | | | | 244/129.2 |
| 2011/0068231 A1 * | 3/2011 | Surawski | ............... | B64D 37/32 |
| | | | | 244/135 R |

OTHER PUBLICATIONS

French Search Report and Written Opinion for FR 1252187, mailed Nov. 23, 2012.

* cited by examiner

INERTING DEVICE, TANK AND AIRCRAFT PROVIDED WITH SUCH A DEVICE, AND CORRESPONDING METHOD

CROSS-REFERENCE TO RELATED APPLICATIONS

This application is a §371 of International PCT Application PCT/FR2013/050150, filed Jan. 25, 2013, which claims §119(a) foreign priority to French patent application 1252187, filed Mar. 12, 2012.

BACKGROUND

Field of the Invention

The present invention relates to an inerting device, a tank and an aircraft provided with such a device as well as a corresponding method.

The invention relates more specifically to an inerting device for an aircraft fuel tank of the pressurized type, that is to say for a tank provided with a main vessel and with a separate overflow space.

Related Art

An inerting device may be used to protect a fuel tank, in particular of an aircraft such as a fixed-wing airplane or a helicopter, for example.

An inerting device replaces the gaseous headspace of a tank by a gas that is enriched with an inert gas (nitrogen), which can be produced by a generator such as an "OBIGGS". These tanks are generally connected to the exterior (the atmosphere) by means of an overflow space (sometimes referred to in English as a "venting box"). The overflow space is a space which communicates with the vessel of the tank containing the liquid fuel, although this overflow space does not contain any liquid fuel under normal circumstances.

Document U.S. Pat. No. 8,074,932 relates to a system for the distribution of nitrogen-enriched gas inside an airplane tank that is subjected to ambient pressure. According to this document, during the descent phases of the airplane, nitrogen-enriched gas is injected into a mixing chamber situated between a communicating wing tank and an emergency reserve tank. The wing tank communicates with a central tank, while the emergency reserve tank communicates with the exterior by means of free openings. An oxygen sensor may be provided, as appropriate, within the wing tanks in order to ensure that the distribution system is able to determine whether the concentrations are acceptable.

This device is satisfactory to some extent, although it does not permit the effective use of the nitrogen-enriched air in all circumstances and it requires a mixing box situated between two remote tanks. The detection of the oxygen concentration is difficult, moreover, and does not provide data that are necessary in order to be able to ensure a concentration of oxygen in the entire tank. Finally, this architecture and this function are not well suited to tanks under pressure.

SUMMARY OF THE INVENTION

The invention relates more specifically to the tanks referred to as being "under pressure". That is to say that the overflow space communicates with the atmosphere by means of two orifices, each provided with a non-return valve ("check valve" in English). A first "ascent" valve opens in order to cause gas to exit from the tank only when the pressure inside the overflow space exceeds the atmospheric pressure by a predetermined value corresponding to the calibration of the valve. This makes it possible to limit the overpressure of the overflow space (and thus of the tank) in relation to the external pressure (in particular in the event of the aircraft ascending).

A second "descent" valve opens in order to cause gas to enter the tank only when the atmospheric pressure exceeds the pressure inside the overflow space by a predetermined value corresponding to the calibration of the valve. This makes it possible to maintain an underpressure inside the overflow space (and thus inside the tank) in relation to the external pressure (in particular in the event of the aircraft descending).

Generally speaking, these tanks include a plurality of compartments separated by baffles provided with openings permitting the exchange of fluids. Ideally, the nitrogen-enriched gas is preferably injected into different parts of the tank, in such a way as to homogenize as far as possible the concentration of oxygen within the tank. However the point of injection of nitrogen-enriched gas is subject to conflicting requirements. In fact, as the aircraft ascends, a part of the gas in the tank exits naturally towards the atmosphere as the atmospheric pressure decreases. Accordingly, in order to optimize the reduction in the concentration of gaseous oxygen inside the tank, the most appropriate point for injecting the nitrogen-enriched gas must be as remote as possible from the outlet orifice controlled by the ascent valve. Conversely, during descent phases of the aircraft (or phases of high fuel consumption), the atmospheric air is admitted into the tank via the descent valve and increases the amount of oxygen inside the tank (up to 21%). In this situation, the most appropriate point for injecting the nitrogen-enriched gas must be as close as possible to the outlet orifice controlled by the descent valve. These two requirements are thus contradictory.

One object of the present invention is to overcome all or some of the disadvantages of the prior art indicated above.

To this end, the device according to the invention, which furthermore complies with the generic definition provided by the above preamble, is characterized essentially in that the device comprises a generator for nitrogen-enriched gas, a circuit for transferring the nitrogen-enriched gas produced by the generator, the transfer circuit comprising an upstream extremity connected to the generator, a first downstream extremity which can be coupled to the main vessel and a second downstream extremity which can be coupled to the overflow space, the device comprising an array of sensors for the measurement of data that are representative of the pressure differential between, on the one hand, the interior of the overflow space and, on the other hand, the exterior of the tank, the device further comprising an electronic logic unit for receiving the measurements from the array of sensors, the electronic logic unit being connected to the generator and/or to the transfer circuit and being designed to control the supply of a flow of nitrogen-enriched gas to the second downstream extremity when the pressure differential between, on the one hand, the interior of the overflow space and, on the other hand, the exterior, falls below a predetermined threshold S.

Furthermore, embodiments of the invention may include one or a plurality of the following characteristics:

the electronic logic unit is designed to control the supply of a flow of nitrogen-enriched gas to the second downstream extremity only when the pressure differential between, on the one hand, the interior of the overflow space and, on the other hand, the exterior of the tank, falls below the predetermined threshold, the second downstream extremity of the transfer circuit comprises a valve for the selective control of the flow of nitrogen-enriched gas intended to be supplied to the overflow space, the said valve being operated by the electronic logic unit, the first downstream extremity of the transfer circuit comprises a valve for the selective control of the flow of nitrogen-enriched gas intended to be supplied to the main vessel, the said valve being operated by the electronic logic unit, the first and second downstream extremities of the circuit are coupled in parallel to the upstream extremity of the circuit, the circuit comprising a three-way valve for the selective regulation of the flows of nitrogen-enriched gas originating from the generator between the first and the second downstream extremities, the three-way valve being operated by the electronic logic unit, one at least from among the upstream extremity, the first downstream extremity and the second downstream extremity of the transfer circuit comprises a non-return valve for preventing a movement of gas from downstream to upstream, one at least from among the first downstream extremity and the second downstream extremity of the transfer circuit comprises an orifice that is calibrated in order to limit the flow of gas to a predetermined value, the generator comprises a concentrator of the separation membrane type.

The invention likewise relates to an aircraft fuel tank of the pressurized type, comprising a main vessel intended to store liquid fuel and a separate overflow space, the overflow space being fluidly connected to the main vessel in order to absorb temporarily, but without retaining them, any overflows of liquid fuel from the main vessel, the overflow space communicating with the exterior of the tank by means of a system of two non-return valves having opposite opening directions, in which the fuel tank comprises an inerting device according to any one of the characteristics described above or below, the first downstream extremity of the transfer circuit being coupled to the main vessel and the second downstream extremity of the transfer circuit being coupled to the overflow space.

Furthermore, embodiments of the invention may include one or a plurality of the following characteristics:

the overflow space communicates with the exterior of the tank via an inlet valve configured to open only when the pressure differential between, on the one hand, the interior (P3) of the overflow space and, on the other hand, the exterior (PA) of the tank, reaches a predetermined opening level (Y), the electronic logic unit being designed to control the supply of a flow of nitrogen-enriched gas to the overflow space via the second downstream extremity when the pressure differential (PA−P3) between, on the one hand, the interior of the overflow space and, on the other hand, the exterior and is between 70% and 100% of the said opening level (PA−P3>70% Y), the electronic logic unit is designed to control the supply of a flow of nitrogen-enriched gas to the overflow space via the second downstream extremity when the pressure differential (P3−Pa) between, on the one hand, the interior of the overflow space (3) and, on the other hand, the exterior of the tank, approaches 50 mbar or reaches the level that is sufficient for the opening of the inlet valve, the array of sensors for the measurement of data that are representative of the pressure differential (P3−Pa) between, on the one hand, the interior of the overflow space and, on the other hand, the exterior of the tank, comprises at least one pressure sensor, the transfer circuit is integrated into the generator and/or the reservoir, the second downstream extremity of the transfer circuit is coupled at the level of a line for venting the overflow space, that is to say at the level of a line providing communication between the overflow space and the exterior of the tank.

The invention likewise relates to an aircraft comprising a fuel tank according to any one of the characteristics described above or below, in which the array of sensors for the measurement of data that are representative of the pressure differential (P3−Pa) between, on the one hand, the interior of the overflow space and, on the other hand, the exterior of the tank, comprises at least one of the following: a sensor for the differential pressure, a couple of pressure sensors, a sensor for the altitude of the aircraft, a sensor for the atmospheric pressure around the aircraft, a sensor for the atmospheric temperature around the aircraft, a sensor for the rate of descent of the aircraft, a sensor for the fuel consumption of the aircraft, a sensor for the pressure of the inlet air supplying the generator for the purpose of its enrichment with nitrogen, a sensor for the temperature of the inlet air supplying the generator for the purpose of its enrichment with nitrogen, a sensor for the flow of nitrogen-enriched gas at the outlet from the generator, a sensor for the concentration of oxygen/nitrogen in the flow of nitrogen-enriched gas at the outlet from the generator (1), a sensor for the flow of nitrogen-enriched gas at the outlet from a buffer tank for storing the nitrogen-enriched gas produced by the generator, a sensor for the concentration of oxygen/nitrogen in the flow of nitrogen-enriched gas at the outlet from a buffer tank for storing the nitrogen-enriched gas produced by the generator.

The invention likewise relates to a method for inerting an aircraft fuel tank of the pressurized type, that is to say a tank provided with a main vessel and with a separate overflow space under pressure, inside which the inerting is achieved by means of an inerting device comprising a generator for nitrogen-enriched gas, the method comprising a stage for the determination of a pressure differential (P3−Pa) between, on the one hand, the interior of the overflow space and, on the other hand, the exterior of the tank, and, when this pressure differential (P3−Pa) falls below a predetermined threshold S, a stage for the transfer of a flow of nitrogen-enriched gas into the overflow space (3).

The invention may likewise relate to any alternative device or method comprising any combination of the characteristics described above or below.

BRIEF DESCRIPTION OF THE FIGURES

Other features and advantages will become apparent from a perusal of the following description, which is given with reference to the figures, in which.

DETAILED DESCRIPTION OF THE INVENTION

Figure 1:
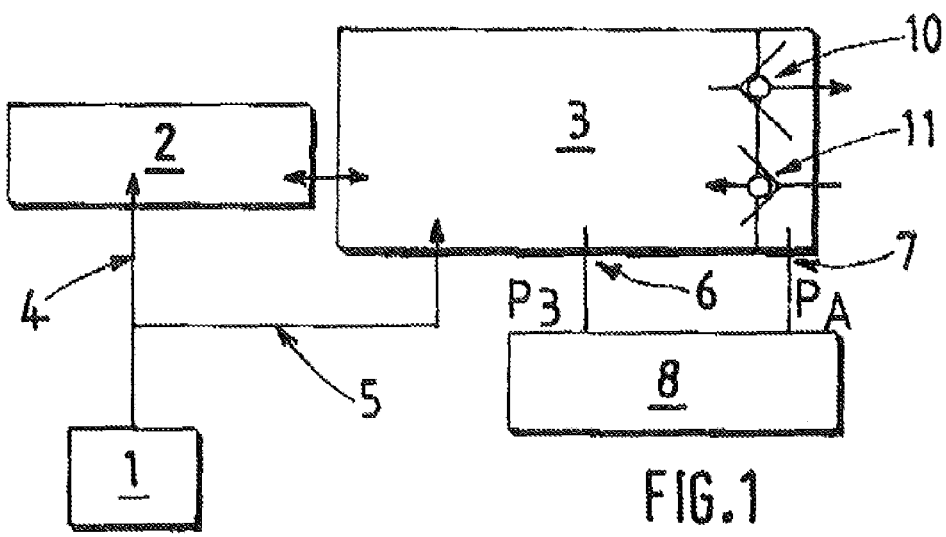
FIG. 1 depicts a schematic and partial view illustrating the structure and the function of an inerting device according to a first possible illustrative embodiment of the invention.

For a further understanding of the nature and objects for the present invention, reference should be made to the detailed description, taken in conjunction with the accompanying drawing, in which like elements are given the same or analogous reference numbers and wherein:

FIG. 1 illustrates an inerting device for a fuel tank of an aircraft.

The tank of the aircraft comprises a main vessel 2 intended to contain the liquid fuel and a separate overflow space 3.

The overflow space 3 communicates fluidly with the main vessel 2 (the communication is symbolized by two arrows in the figure).

The overflow space 3 does not contain liquid fuel under normal circumstances, but is able to absorb any overflows in the course of filling or during certain movements.

The tank is of the "under pressure" type, that is to say that the overflow space 3 communicates with the external atmosphere by means of two orifices, each provided with a non-return valve ("check valve" in English). A first "ascent" valve 10 opens only when the pressure inside the overflow space 3 exceeds the atmospheric pressure by a predetermined value corresponding to the calibration of the valve 10 (FIG. 1 includes an arrow which symbolizes the possible exit of the gas from the overflow space 3).

A second "descent" valve 11 opens only when the overflow atmospheric pressure exceeds the pressure inside the overflow space 3 by a predetermined value corresponding to the calibration of the valve 11 (FIG. 1 includes an arrow which symbolizes the possible entry of the gas into the overflow space 3). In this way, the system of valves 10, 11 maintains a predetermined pressure (positive or negative) inside the overflow space 3 (and inside the main vessel 2).

Thus, when the aircraft is at a high altitude (for example above 4000 m), the pressure inside the tank is equal to the external atmospheric pressure plus the value of the pressure necessary to cause the ascent valve 10 to open. The descent valve 11 is closed, and the ascent valve 10 is open. When the aircraft begins to lose altitude, the pressure within the tank reduces progressively, the ascent valve 10 then closes and the two valves 10, 11 are then closed. During the descent, when the pressure inside the tank reaches the atmospheric pressure less the opening value of the descent valve 11, the latter opens and allows air to enter.

The device comprises a generator 1 for nitrogen-enriched gas, for example a membrane separator and/or a nitrogen reserve under pressure any other appropriate apparatus, and a circuit 4, 5 for transferring the nitrogen-enriched gas produced by the generator 1. The transfer circuit 4, 5 comprises an upstream extremity connected to the generator 1, a first downstream extremity 4 coupled fluidly to the main vessel 2 and a second downstream extremity 5 coupled to the overflow space 3.

The nitrogen-enriched gas produced by the generator 1 is thus supplied selectively and simultaneously to the main vessel 2 and to the overflow space 3. The device comprises an array of sensors 6, 7 for the measurement of data that are representative of the pressure differential P3–Pa between, on the one hand, the interior of the overflow space 3 and, on the other hand, the exterior of the tank. The array of sensors is connected to an electronic logic unit 8. The electronic logic unit 8 is connected to the generator 1 and/or to the transfer circuit 4, 5 and is designed to control the supply of a flow of nitrogen-enriched gas to the tank and, in particular, to the overflow space 3 when the pressure differential P3–Pa between, on the one hand, the interior of the overflow space 3 and, on the other hand, the exterior, falls below a predetermined threshold S.

More specifically, the electronic logic unit 8 is thus able to determine the moment when the pressure inside the tank decreases and reaches a predetermined value that is close or equal to the value that is necessary to cause the descent valve 11 to open. This makes it possible to determine when air is entering or is about to enter the tank.

On the basis of these observations, the electronic logic unit 8 is able to control the injection of nitrogen into the tank at the moment when, or slightly before, the air enters the tank.

For example, the descent valve 11 opens only when the external atmospheric pressure exceeds the pressure inside the tank by a value situated between 0.1 psi (689 Pa) and 5.0 psi (34,474 Pa). For example, the injection of nitrogen into the overflow space 3 takes place when the external atmospheric pressure exceeds the pressure inside the tank by a value situated between 0.1 psi (689 Pa) and 5.0 psi (34,474 Pa).

The array of sensors for the measurement of data that are representative of the pressure differential P3–Pa between, on the one hand, the interior of the overflow space 3 and, on the other hand, the exterior of the tank, may comprise, for example, at least one pressure sensor. For example, and as illustrated in FIG. 1, two sensors 6, 7 can measure the pressure P3, PA respectively inside the overflow space 3 and on the exterior of the tank. The two sensors 6, 7 thus measure a differential pressure.

Of course, the array of sensors for the measurement of data that are representative of the pressure differential P3–Pa is not limited to this embodiment. The array of sensors may thus comprise at least one of the following: a sensor for the differential pressure, a couple of pressure sensors, a sensor for the altitude of the aircraft, a sensor for the atmospheric pressure around the aircraft, a sensor for the atmospheric temperature around the aircraft, a sensor for the rate of descent of the aircraft, a sensor for the fuel consumption of the aircraft, a sensor for the pressure of the inlet air supplying the generator for the purpose of its enrichment with nitrogen, a sensor for the temperature of the inlet air supplying the generator for the purpose of its enrichment with nitrogen, a sensor for the flow of nitrogen-enriched gas at the outlet from the generator, a sensor for the concentration of oxygen/nitrogen in the flow of nitrogen-enriched gas at the outlet from the generator 1, a sensor for the flow of nitrogen-enriched gas at the outlet from a buffer tank for storing the nitrogen-enriched gas produced by the generator 1, a sensor for the concentration of oxygen/nitrogen in the flow of nitrogen-enriched gas at the outlet from a buffer tank for storing the nitrogen-enriched gas produced by the generator 1.

In general, any device permitting the detection of the entry of air into the tank or the imminent entry of air due to a drop in relative pressure inside the tank in relation to the exterior may be utilized to control the supply of nitrogen-enriched gas to the overflow space 3. In this way, the device permits the level of oxygen inside the tank to be prevented from rising before and/or during the entry of air into the overflow space 3.

FIGS. 2 to 5 illustrate possible variant embodiments of the invention. In the interests of brevity, the elements that are identical to those described above are designated by the same numerical references and are not described for a second time.

Figure 2:
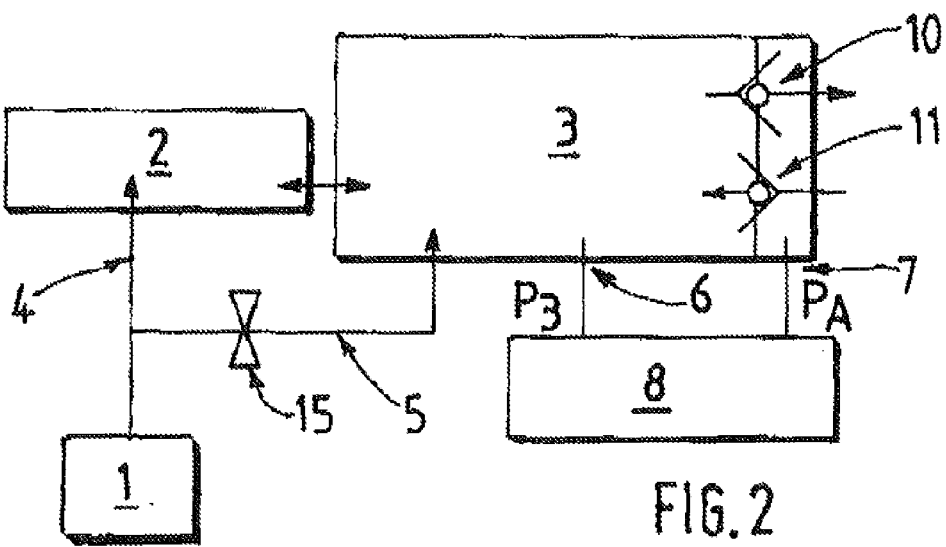
FIG. 2 depicts a schematic and partial view illustrating the structure and the function of an inerting device according to a second possible illustrative embodiment of the invention.

The embodiment depicted in FIG. 2 differs from that in FIG. 1 solely in the sense that the second downstream extremity 5 of the transfer circuit comprises a valve 15 for the selective control of the flow of nitrogen-enriched gas that is intended to be supplied to the overflow space 3. The said valve 15 is preferably operated by the electronic logic unit 8 in order to control the enriched gas supplied to the overflow space 3. The valve is of the all-or-nothing type or proportional. In this way, the nitrogen-enriched gas is always injected into the main vessel 2, although the injection into the overflow space 3 only takes place when it is necessary (during or before an entry of air).

Figure 3:
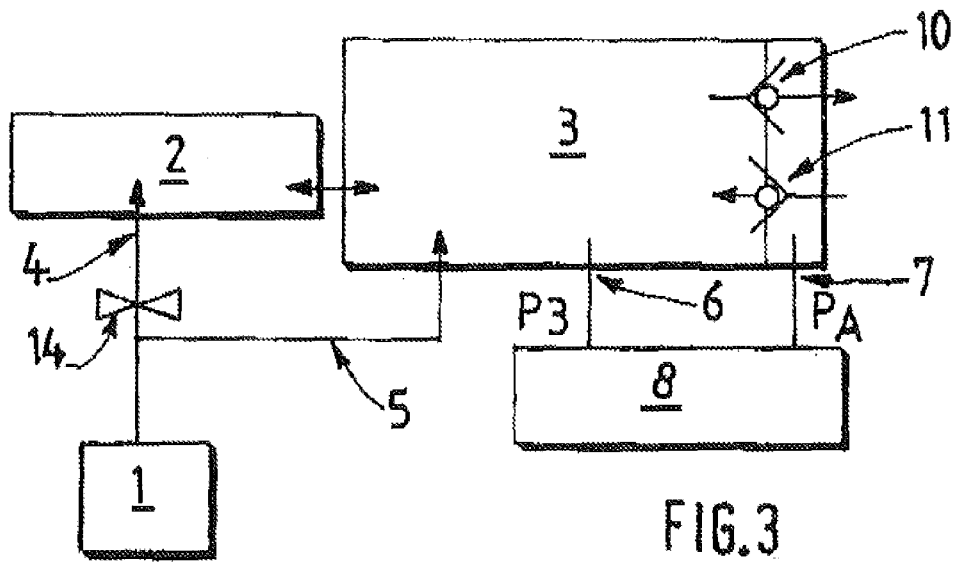
FIG. 3 depicts a schematic and partial view illustrating the structure and the function of an inerting device according to a third possible illustrative embodiment of the invention.

The embodiment in FIG. 3 differs from that in FIG. 1 solely in the sense that the first downstream extremity 4 of the transfer circuit comprises a valve 14 for the selective control of the flow of nitrogen-enriched gas that is intended to be supplied to the main vessel 2. This valve 14 (of the all-or-nothing type or proportional) is preferably operated by the electronic logic unit 8.

In this way, the nitrogen-enriched gas is always injected into the overflow space 3, although the injection into the main vessel 2 only takes place when this is required.

Figure 4:
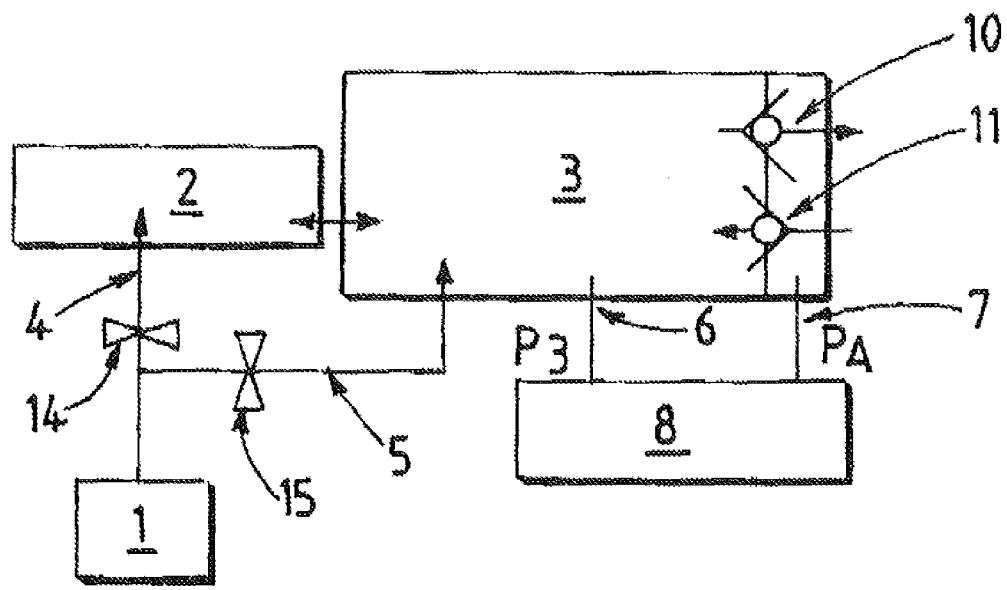
FIG. 4 depicts a schematic and partial view illustrating the structure and the function of an inerting device according to a fourth possible illustrative embodiment of the invention.

In the embodiment depicted in FIG. 4, the first 4 and the second downstream extremity 5 each include a respective control valve 14, 15. This makes it possible to control the quantities of nitrogen-enriched gas that are supplied independently to the main vessel 2 and to the overflow space 3.

Figure 5:
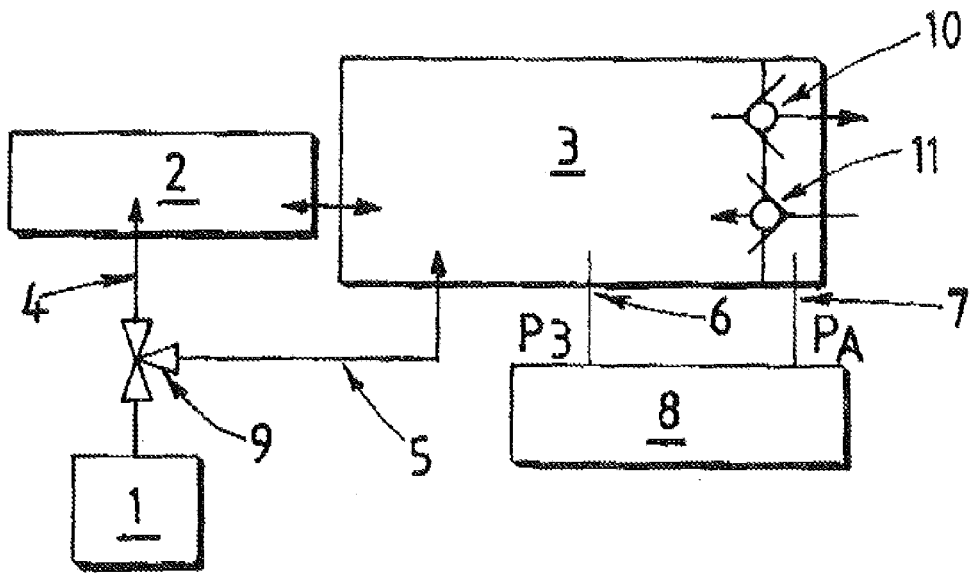
FIG. 5 depicts a schematic and partial view illustrating the structure and the function of an inerting device according to a fifth possible illustrative embodiment of the invention.

According to the embodiment depicted in FIG. 5, a three-way valve 9 is provided in the circuit for the selective regulation of the flows of nitrogen-enriched gas originating from the generator 1 between the first 4 and the second 5 downstream extremities. This three-way valve 9 preferably does not permit the supply of nitrogen-enriched gas at the same time to the two downstream extremities, but to one or the other alternately.

The structural characteristics of the above embodiments may be combined where appropriate.

Similarly, for each of the above embodiments, it is possible to provide a non-return valve at the first downstream extremity 4 and/or the second downstream extremity 5 of the transfer circuit, so as to prevent movement of the gas from downstream to upstream.

Furthermore, a calibrated orifice may be provided on the first downstream extremity 4 and/or on the second downstream extremity 5 of the transfer circuit in order to restrict the flow of gas to a predetermined value.

In addition, the transfer circuit may be integrated physically into the generator 1 and/or the tank.

According to another possible feature, the second downstream extremity 5 of the transfer circuit may be coupled at the level of a venting line for the overflow space 3, that is to say at the level of a line providing communication between the overflow space 3 and the exterior of the tank.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An aircraft fuel tank of the pressurized type, comprising:
   a main vessel intended to store liquid fuel;
   a separate overflow space, the overflow space being fluidly connected to the main vessel in order to absorb temporarily, but without retaining, any overflows of liquid fuel from the main vessel, the overflow space communicating with an exterior of the tank via first and second non-return valves, the first non-return valve only allowing a flow of gas from the overflow space to an exterior of the tank and being calibrated to open only when a pressure of the overflow space is greater than a pressure of the exterior of the tank by a predetermined value associated with the first non-return valve, the second non-return valve only allowing a flow of gas from the exterior of the tank to the overflow space and being calibrated to open only when the pressure of the exterior of the tank is greater than the pressure of the overflow space by a predetermined value associated with the second non-return valve; and
   an inerting device for a aircraft fuel tank of the pressurized type that is provided with a main vessel and with a separate overflow space, said inerting device comprising:
   a nitrogen-enriched gas generator;
   a circuit for transferring the nitrogen-enriched gas produced by the generator, the transfer circuit comprising an upstream extremity connected to the generator, a first downstream extremity which can be coupled to the main vessel and a second downstream extremity which can be coupled to the overflow space;
   an array of sensors for measuring a pressure differential between a pressure of an interior of the overflow space and a pressure of an exterior of the tank; and
   an electronic logic unit for receiving the measured pressure differential from the array of sensors, the electronic logic unit being connected to the generator and/or to the transfer circuit, the electronic logic unit being designed to control a supply of a flow of the nitrogen-enriched gas to the second downstream extremity when the pressure differential is less than a predetermined threshold S, the first downstream extremity of the transfer circuit being coupled to the main vessel and the second downstream extremity of the transfer circuit being coupled to the overflow space, the electronic logic unit being designed to control the supply of a flow of nitrogen-enriched gas to the overflow space via the second downstream extremity when the pressure of the exterior of the tank is greater than a pressure of the overflow space by at least 70% of the predetermined value associated with the second non-return valve.

2. The aircraft fuel tank of claim 1, wherein the electronic logic unit is designed to supply the flow of nitrogen-enriched gas to the second downstream extremity only when the pressure differential falls below the predetermined threshold.

3. The aircraft fuel tank of claim 1, wherein the first downstream extremity of the transfer circuit comprises a first control valve for the selective control of the flow of nitrogen-enriched gas intended to be supplied to the main vessel, said first valve being operated by the electronic logic unit.

4. The aircraft fuel tank of claim 1, wherein the second downstream extremity of the transfer circuit comprises a second control valve for the selective control of the flow of nitrogen-enriched gas intended to be supplied to the overflow space, said second valve being operated by the electronic logic unit.

5. The aircraft fuel tank of claim 1, wherein the first and second downstream extremities of the circuit are coupled in parallel to the upstream extremity of the circuit, the circuit further comprising a three-way valve for selective regulation of flows of nitrogen-enriched gas originating from the generator to the first and the second downstream extremities, the three-way valve being operated by the electronic logic unit.

6. The aircraft fuel tank of claim 1, wherein the generator comprising a gas separation membrane.

7. The tank of claim 1, wherein the electronic logic unit is designed to control the supply of the flow of nitrogen-enriched gas to the overflow space via the second downstream extremity when the pressure differential PA−P3 between the pressure of the exterior of the tank PA and the overflow space P3:
   approaches 50 mbar, or
   reaches the predetermined value that is associated with the second non-return valve.

8. The tank of claim 1, wherein the electronic logic unit is designed to control the supply of a flow of nitrogen-enriched gas to the overflow space via the second downstream extremity when the pressure of the exterior of the tank is greater than a pressure of the overflow space by at least 70% of the predetermined value associated with the first non-return valve.

9. The tank of claim 1, wherein the array of sensors comprises at least one pressure sensor.

10. An aircraft comprising a fuel tank of claim 1, wherein the array of sensors comprises at least one of the following: a sensor for the differential pressure, a couple of pressure sensors, a sensor for the altitude of the aircraft, a sensor for the atmospheric pressure around the aircraft, a sensor for the atmospheric temperature around the aircraft, a sensor for the rate of descent of the aircraft, a sensor for the fuel consumption of the aircraft, a sensor for the pressure of the inlet air supplying the generator for the purpose of its enrichment with nitrogen, a sensor for the temperature of the inlet air supplying the generator for the purpose of its enrichment with nitrogen, a sensor for the flow of nitrogen-enriched gas at the outlet from the generator, a sensor for the concentration of oxygen/nitrogen in the flow of nitrogen-enriched gas at the outlet from the generator, a sensor for the flow of nitrogen-enriched gas at the outlet from a buffer tank for storing the nitrogen-enriched gas produced by the generator, a sensor for the concentration of oxygen/nitrogen in the flow of nitrogen-enriched gas at the outlet from a buffer tank for storing the nitrogen-enriched gas produced by the generator.

11. A method for inerting the fuel tank of the aircraft of claim 10, comprising the steps of:
   determining, with the electronic logic unit, the pressure differential between a pressure of an interior of the overflow space and a pressure of an exterior of the tank, and
   when the pressure differential falls below a predetermined threshold S, allowing a flow of nitrogen-enriched gas from the generator into the overflow space via the second extremity.

12. A method for inerting a fuel tank of an aircraft, comprising the steps of: providing an aircraft; determining, with an electronic logic unit, the pressure differential between a pressure of an interior of a separate overflow space of the fuel tank and a pressure of an exterior of the tank; and when the pressure differential falls below a predetermined threshold S, allowing a flow of nitrogen-enriched gas from nitrogen-enriched gas generator into the overflow space via a second extremity, the aircraft comprising an aircraft fuel tank of the pressurized type, the electronic logic unit allowing the flow of nitrogen-enriched gas to the overflow space from the generator when the pressure of the exterior of the tank is greater than a pressure of the overflow space by at least 70% of a predetermined value associated with a second non-return valve, wherein the aircraft fuel tank comprises:
   a main vessel intended to store liquid fuel;
   the separate overflow space, the overflow space being fluidly connected to the main vessel in order to absorb temporarily, but without retaining, any overflows of liquid fuel from the main vessel, the overflow space communicating with an exterior of the tank via a first non-return valves and the second non-return valve, the first non-return valve only allowing a flow of gas from the overflow space to an exterior of the tank and being calibrated to open only when a pressure of the overflow space is greater than a pressure of the exterior of the tank by a predetermined value associated with the first non-return valve, the second non-return valve only allowing a flow of gas from the exterior of the tank to the overflow space and being calibrated to open only when the pressure of the exterior of the tank is greater than the pressure of the overflow space by the predetermined value associated with the second non-return valve; and
   an inerting device for a aircraft fuel tank of the pressurized type that is provided with a main vessel and with a separate overflow space, said inerting device comprising:
   the nitrogen-enriched gas generator;
   a circuit for transferring the nitrogen-enriched gas produced by the generator, the transfer circuit comprising an upstream extremity connected to the generator, a first downstream extremity which can be coupled to the main vessel and the second downstream extremity, the second downstream extremity which can be coupled to the overflow space;
   an array of sensors for measuring a pressure differential between a pressure of an interior of the overflow space and a pressure of an exterior of the tank, the array of sensors comprising at least one of the following: a sensor for the differential pressure, a couple of pressure sensors, a sensor for the altitude of the aircraft, a sensor for the atmospheric pressure around the aircraft, a sensor for the atmospheric temperature around the aircraft, a sensor for the rate of descent of the aircraft, a sensor for the fuel consumption of the aircraft, a sensor for the pressure of the inlet air supplying the generator for the purpose of its enrichment with nitrogen, a sensor for the temperature of the inlet air supplying the generator for the purpose of its enrichment with nitrogen, a sensor for the flow of nitrogen-enriched gas at the outlet from the generator, a sensor for the concentration of oxygen/nitrogen in the flow of nitrogen-enriched gas at the outlet from the generator, a sensor for the flow of nitrogen-enriched gas at the outlet from a buffer tank for storing the nitrogen-enriched gas produced by the generator, and a sensor for the concentration of oxygen/nitrogen in the flow of nitrogen-enriched as at the outlet from a buffer tank for storing the nitrogen-enriched gas produced by the generator; and the electronic logic unit for receiving the measured pressure differential from the array of sensors, the electronic logic unit being connected to the generator and/or to the transfer circuit, the electronic logic unit being designed to control a supply of the flow of the nitrogen-enriched gas to the second downstream extremity when the pressure differential is less than a predetermined threshold S, the first downstream extremity of the transfer circuit being coupled to the main vessel and the second downstream extremity of the transfer circuit being coupled to the overflow space.

13. The method of claim 12, wherein the electronic logic unit allows the flow of nitrogen-enriched gas to the overflow space from the generator when the pressure differential PA–P3 between the pressure of the exterior of the tank PA and the overflow space P3:

approaches 50 mbar, or reaches the predetermined value that is associated with the second non-return valve.

14. The method of claim 12, wherein the electronic logic unit allows the flow of nitrogen-enriched gas to the overflow space from the generator when the pressure of the exterior of the tank is greater than a pressure of the overflow space by at least 70% of the predetermined value associated with the first non-return valve.

* * * * *